April 4, 1961

W. W. WAHLGREN 2,978,659

MOISTURE-PROOF WINDING

Filed Jan. 24, 1958

INVENTOR.
WALLACE W. WAHLGREN

BY

Lippincott, Smith & Ralls
ATTORNEYS

United States Patent Office 2,978,659
Patented Apr. 4, 1961

2,978,659

MOISTURE-PROOF WINDING

Wallace W. Wahlgren, Oakland, Calif., assignor to Electro Engineering Works, San Leandro, Calif., a corporation of California Filed Jan. 24, 1958, Ser. No. 710,949

5 Claims. (Cl. 336—96)

This invention relates to coils for inductive apparatus such as transformers and reactors and to methods of constructing the same, this application being a continuation-in-part of copending application Serial No. 420,926, filed April 5, 1954, now abandoned.

While coils made in accordance with the present invention are of general utility they have a special field of usefulness in military applications where the service conditions that must be met by them are particularly severe. Thus, electrical equipment for military use is likely to be subjected not only to normal exposure to weather but it is peculiarly subject to accident. Many military specifications require that apparatus be capable of immediate use after submersion if merely wiped to remove the surface moisture. Where such apparatus is to be used in aircraft, it is important that its size and weight be reduced as far as possible. The power rating of such coils is determined by the maximum temperature to which the windings can be raised without deterioration. This temperature, in turn, depends upon the ambient temperature to which the coils are subjected and the temperature differential between the "hot spot" within the winding and the exposed surface that dissipates the heat generated by flow of current within the windings themselves; the smaller this temperature differential, the greater the cooling efficiency and therefore the smaller and lighter the apparatus for a given power output.

The problems of complete moisture or waterproofing and cooling are mutually antagonistic, as a thermal gradient always develops across the waterproofing material, retarding the outward flow of heat.

The antagonism between the two requirements of waterproofing and light weight are aggravated in the case of equipment adapted for installation in supersonic aircraft or guided missiles. In such use the skin friction (to use a somewhat loose terminology) may raise the effective ambient temperature at which the electrical equipment may be required to operate to several hundred degrees centigrade, this requiring special coil constructions, since such ambient temperatures are themselves higher than ordinary structural materials can sustain for any material period, even when not carrying electrical loads. The margin of safety, even when special materials are used, becomes very narrow, with the result that large amounts of iron and copper must be used to reduce the rate of heat evolution to a minimum and this in precisely the equipment where it is particularly desirable to subject these materials to high duty rates and operate them at a maximum temperature rise above ambient.

The primary objects of the present invention are to provide a type of winding which is completely impervious to moisture and will withstand indefinite submersion and which, at the same time, develops a minimum temperature gradient between its internal "hot spot" and the surface in order to dissipate a given amount of power. Other objects are to provide a construction of minimum weight and low cost.

In accordance with present practice there are two general methods of completely waterproofing inductive apparatus; these are "potting" and "encapsulating." In accordance with the first, a metallic case or can is provided within which the transformer, reactor, or other unit is placed, and the voids within the can are filled with an insulating potting compound. The latter may be either a wax or mixture of waxes, resins, or the like, or it may be one of the synthetic resins which can be polymerized after the voids are filled. In either case it is necessary that there be some spacing between the coils and the walls of the casing, as otherwise bubbles may be left between the windings and the casing to form dead air spaces which act as thermal insulators.

In the flow of heat from the surface of the coil to the outer surface of the apparatus, where it is dissipated by radiation, conduction or convection, there is almost always a sharp temperature gradient at the junction between two dissimilar materials. Within any one of such materials there is a substantially uniform temperature gradient between the interior and the exterior surface thereof and the temperature differential between these surfaces is approximately in direct proportion to the thickness of the intervening material. The insulating potting compounds are relatively poor thermal conductors.

Coils used in the type of equipment here considered must ordinarily, for electrical reasons, be wound of insulated conductor and therefore there is, in general, a temperature gradient through the insulation from the outer layer to whatever material is used in contact with it. At this outer surface there is a gradient occurring at the transfer of heat from the insulation to the potting compound, a further gradient through perhaps a quarter of an inch of potting compound to the inner surface of the case, and a relatively small temperature gradient from the inner to the outer surface of the case from which latter the heat is dissipated.

In an encapsulated coil the case is omitted and the entire equipment is coated with a layer of insulating plastic. The natural resins are too brittle for satisfactory use for this purpose so synthetic resins must ordinarily be used. These are cast around the coil and the problem of filling the voids is much the same as in the case of the voids in a potted device. The result is a relatively thick layer of plastic covering the coil through which the heat must be transmitted before it can be dissipated. The final transfer from the compound to an enclosing casing is avoided, and the mold in which the casting takes place can usually be made to follow the contour of the coil and its core, if any, more closely than does the casing of a potted device, so that the heat dissipation may be somewhat more efficient in the encapsulated device. Nevertheless, the temperature differential between the hot-spot and the surface is still very material.

There are various modifications for these two general types of waterproofing. The coil may, for example, be inserted in an insulating casing instead of a metal one, resulting in an even less effective dissipation of heat, or, the coil may be wrapped in presumably waterproof materials such as impregnated paper or cloth, e.g., varnished cambric, and dipped. Coils so treated will not usually pass submersion tests nor is their heat dissipation as good as that of the types thus described in detail.

In accordance with the present invention the coil that is to be waterproofed is wound of insulated conductor in the ordinary manner. There is then applied, over the completed coil, a single turn of an inherently impermeable membrane, the ends of the turn preferably overlapping just sufficiently to permit their being sealed or cemented together with an insulating cement, and the membrane being wide enough to project slightly beyond the ends of the coil to form a shallow receptacle capable of retaining a liquid. The depth of the receptacle thus formed is of the same order of magnitude as the thickness of the encapsulating materials used in the process described above. There are two classes of materials which are truly inherently impervious; the first of these are thin metal sheets, hereinafter referred to as "foils." The second class of materials includes synthetic plastic film, of which the most suitable now available is polytetrafluorethylene (which is marketed under the trade name "Teflon" and will be so referred to hereinafter), which has a moisture absorption coefficient of zero. Polyethylene films, with an absorption coefficient closely approaching zero (0.0003) are usable, as are certain forms of polystyrene, since their total absorption is so low and the rate of diffusion through the film from the surface layers is so slow that the penetration of moisture through these films is undetectable. It is to be noted that the natural resins and oxydized oils, which are frequently used for treating fibrous insulating materials, all absorb moisture which diffuses through them. These treated materials are therefore not "inherently impervious."

In the preferred method of construction the coil is then stood on one end and the receptacle on the other filled with one of the synthetic polymerizable compounds, in a liquid state, and it is then cured or partially cured to form a permanent seal adherent to the membrane. The coil is then inverted and the process repeated at the other end, this time carrying the curing process to completion. Conveniently the coil is impregnated with the same synthetic compound used for sealing at the same time that one or the other of the ends is filled and cured.

The resins used are preferably of the thermo-setting type, those preferred being themselves water repellant, with low absorption coefficients. The best presently available are the epoxy resins which may be used most conveniently where the temperature at which the apparatus is to operate is moderate or, where higher temperatures are employed, silicone rubbers.

The result is a completely impervious coating which will stand the same rigorous submersion tests that are applied to full encased equipment of the same type but wherein the temperature differential between the hot spot and the surface is a small fraction of that occurring in apparatus that is moisture-proofed by any of the conventional methods. Moreover, no expensive encapsulating molds are required, and the efficient heat dissipation permits the use of smaller coils and cores for the same temperature rise.

The method of construction is applicable to a wide range of apparatus and can be varied as to detail to meet the individual requirements of the equipment on which it is used. In different types and sizes of equipment the primary advantage of the invention may lie in different features. Thus in highly miniaturized equipment, wherein the coils themselves may have dimensions of the order of 10 to 20 mm. in diameter, it may be the reduction of size that is most important, since conventional methods of encapsulation require a coating of at least 3 mm. thickness which is, when added to both sides of a coil, an important percentage addition to the total size. For such equipment either an insulating membrane or a foil may be used. In other cases whether the equipment be large or small, a high thermal efficiency may be the important factor and the reduction in size merely a bonus. For high temperature applications the foil membrane can be made to withstand temperatures which the insulating film would not support. On the other hand, for high voltage applications the film membrane may reduce insulation problems. For still other applications composite films may be used as will be described in detail hereinafter.

The nature of the invention will be more clearly understood by reference to the detailed descriptions that follow and are illustrated by the accompanying drawings wherein.

Figure 1:
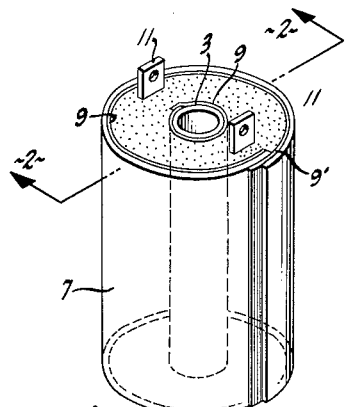
Fig. 1 is an isometric view of a cylindrical coil constructed in accordance with the present invention.
Figure 2:
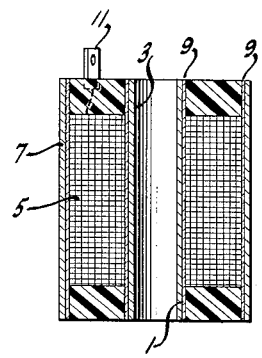
Fig. 2 is a view in cross-section of the coil of Fig. 1, the plane of section being indicated by the line 2—2 of the first figure.

One of the simplest forms of coil embodying the invention is shown in Figs. 1 and 2. These illustrations show the invention as applied to coils of the smallest size, so that the drawings are on an enlarged scale and the dimensions thereof somewhat exaggerated. In forming a coil of this kind a layer of inherently impervious membrane 1 is first applied to a winding mandrel. For coils of this type the membrane may be either a metal foil or a synthetic plastic; if the latter preferred material is "Teflon," treated to make it bondable, as this is not only completely impervious to moisture but is practically unaffected by all but a very few chemicals and will withstand temperatures up to 300° C. it is therefore suitable for all except the very highest temperature applications. Where the temperature requirements are less stringent other materials are useful: polyethylene, for example, is substantially impervious and non-wetted by water. It will not, however, withstand temperatures approaching 100° C. in its usual forms.

If the impervious layer used is of metal foil the membrane used may be composite, a layer 3 of thin insulation such as paper or synthetic film being applied to the foil before winding it upon the mandrel, the insulation being cemented to the foil by any suitable adhesive, preferably a synthetic, thermo-setting resin.

The membrane is applied as a single turn, the ends of which overlap only sufficiently to permit their being sealed together to form a water-tight, moisture-proof joint. In order to prevent the metal from forming a short circuited turn which would reduce the effective inductance of the coil the sealed ends must be insulated from each other. If the layer 3 is used the insulation forms sufficient insulation; if not, a strip of insulation applied along the overlapping portions may be substituted.

The coil 5 itself is then wound over the central portion of the mandrel, leaving the ends of the impervious layer projecting slightly from beneath the coil at either end.

After the winding is completed, a single turn 7 of the impervious membrane chosen is tightly wound over the coil, with its ends overlapping and sealed in the same manner as the layer applied to the mandrel. The same precautions as to sealing to prevent the formation of a short-circuited turn are used as in the case of the inner turn of membrane. If a complete layer is not used insulation between the overlapping ends can be supplied by a narrow strip extending only from the point indicated by the reference character 9' of Fig. 1 to the exposed edge.

Whatever the type of membrane used it is important that it be thin enough so that it can be stretched into intimate contact with the coil. As far as the inner membrane 1 is concerned such contact is assured by the tensions normally applied to the wire in winding. For the outer layer it is the flexibility of the membrane itself that permits such contact to be attained. The membrane need be only sufficiently thick to insure that it is without pin holes that would permit the penetration of moisture and to give sufficient body so that it can be handled without rupture. Depending upon the dimensions in which it has to be handled its thickness can be anywhere from a mil or thereabout upward. Where the invention is employed to encase large transformers, of many kilowatts rating, the thickness of the membrane may be somewhat greater than would ordinarily be termed "foil." In the majority of cases, however, the thickness used will be 5 mils or less, and the term "foil" appears the most suitable, as a generic term for metallic membranes. It is to be noted that the membrane is not relied upon in any sense for its mechanical strength. As long as it is thick enough to permit handling and to present a completely continuous surface, without pores or pin holes, it is adequate for the purpose; if these conditions are met the thinner it is the better.

The coil is next removed from the mandrel and stood on end, and the trough-like receptacle formed at the top is filled with a thermosetting plastic.

The most suitable of these, before complete setting, can exhibit wide variations in viscosity, depending on temperature and the degree to which polymerization has been carried before being applied or to which inorganic fillers have been added. It is convenient to use a fairly viscous liquid in filling the first receptacle, so that it will not penetrate and leak out of the bottom of the coil and be wasted and also to reduce the coefficient of expansion. The filling is polymerized to a solid, although not necessarily fully cured state, and the coil is then inverted and the operation repeated at the other end.

In this second filling the material used is preferably more fluid, either because of a lower state of polymerization or because applied at a higher temperature so that it will penetrate and impregnate the coil. Such impregnation is preferably carried out in the usual manner, first by the application of vacuum to permit the penetration of the impregnating material into the voids between the turns, then pressure to force its entry and compress any bubbles that many remain. Liquid plastic is added to fill the receptacle during or after impregnation, the final addition preferably containing an inorganic filler. Polymerization of the filling at both ends is then carried to completion.

It will be evident that other impregnating procedures can be employed, i.e., impregnation before filling the ends, as an entirely separate process. The preferred method has the advantage of requiring fewest handlings and a minimum of impregnating equipment, the coil acting as its own impregnating vessel.

Of the impregnating materials available those preferred for general use are the epoxy resins, as their absorption coefficients are low and they therefore require minimum thickness to make them impervious after curing, their viscosity can be controlled readily and they can be either thermally or catalytically cured. For higher temperature operation the silicone rubbers have even lower absorption coefficients but they are stickier and impregnation by them is more difficult, although still possible. They are also more expensive. Most of the other available plastics have higher absorption coefficients and thicker layers are required to make them impermeable.

The thickness of the mass of polymerized resins formed within the receptacle is substantially independent of the size of the coil. A satisfactory depth is in the neighborhood of 3 mm. or, say, from one-tenth to one-eighth of an inch. Although the suitable resins, when used without fillers, are substantially impervious to moisture, when completely immersed for protracted periods some very slight absorption of moisture does occur. This diffuses very gradually through the mass. Practically all of that absorbed is in the surface layers and with a thickness of the order of magnitude that has been suggested the amount that actually penetrates to the windings is at most a barest trace. With ordinary methods of plastic encapsulization a coating of this thickness covering all surfaces of the coil, inside and out, is sufficiently impervious to pass all military tests. With the present invention it is only the ends of the coil that are subject even to this infinitesimal amount of penetration; the metal foils and the plastic films that are suitable for the purpose that have been listed above are absolutely impervious in the thinnest of complete layers that can be handled.

It is this fact that leads to one of the greatest advantages of the present invention; the thinnest cast plastic layer that is feasible is of the order of 100 mils in thickness; the total thickness of the membranes employed in this invention is not more than a tenth as great and usually not more than one-twentieth as great. Even if it be assumed that the thermal resistivity of the membrane is as high as that of the cast plastic, the temperture differential between the coil and its outer surface is therefore only one-tenth that of the ordinary plastic-encased coil to achieve the same amount of dissipation. This means that the coil runs much cooler when carrying the same load, or if the same temperature differential is maintained, the heat resulting from a much larger thermal loss in the coil can be radiated.

The dissipation from the ends of the coils will, of course, be the same in both instances for a given temperature differential; nonetheless, from five to ten times the amount of heat can be transferred from the interior of the coil to the external surfaces as with the conventional construction, the temperature rise of the coil being the same in both instances.

When a metal foil membrane is used the temperature gradient will be even lower, the difference in temperature between the outer surface of the coil itself and the outer surface of the membrane being the same within a degree or less.

Figure 3:
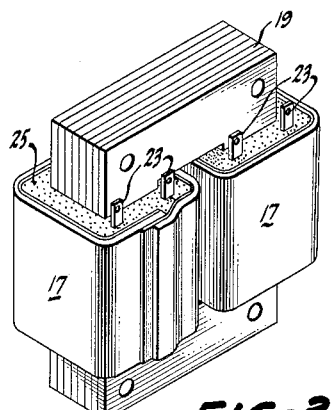
Fig. 3 is an isometric view of a transformer embodying the invention.
Figure 4:
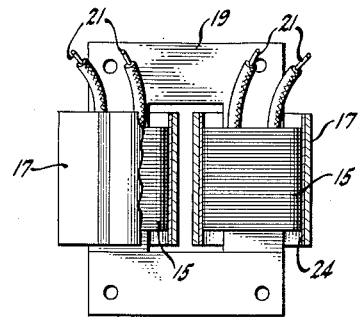
Fig. 4 is a view in side elevation of the core and coils of a typical transformer to which the invention may be applied, portions being cut away to show the construction.
Figure 5:
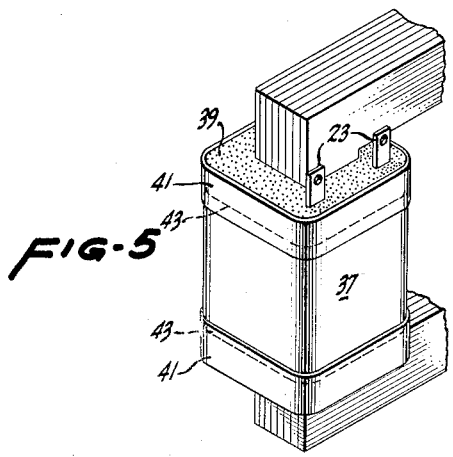
Fig. 5 illustrates a coil in accordance with the present invention employing a composite membrane, the central portion of which is a metallic foil and the end portions whereof are formed as collars of plastic film.

Although the moisture proofing the coil is complete at the stage of the operation thus far described, it is frequently desirable, particularly where radiation is relied upon to dissipate the heat generated, to add a final coat of dark-colored resin. All of the metals that are suitable for the purposes here described are relatively poor radiators of heat and the plastic films are white or nearly so. Even though the additional coating of resin adds a heat barrier of as much as one or two mils, the improvement in radiation efficiency from a dark coating will more than compensate for this by reducing the gradient between the external surface of the coated coil and its surroundings by improving the coefficient or radiation many fold. In the event that convection or conduction is used for cooling this is unimportant.

Where the inductor comprises a plurality of coils mounted on separate legs of a closed ferromagnetic core a slightly different form of the invention may be used as illustrated in Figs. 3, 4, and 5. In this case the coils may either be wound directly on the legs of the core, to which the connecting yokes are later assembled, or they may be mandrel-wound without the use of an internal membrane and slipped over the legs, which is the usual and preferred procedure. In either case the bare coils 15 are tightly wound with a single layer of membrane 17, as in the case of the coil of Figs. 1 and 2, and then are mounted on the completed core 19 as illustrated in Fig. 3.

As in this construction the coils are supported by the core it makes no difference whether the leads 21 are brought out from the end of the coil that is filled first or last. The leads may terminate in connecting lugs 23, projecting from the plastic filling 25, as illustrated in Fig. 3. The filling is applied in exactly the same manner as in the case of Figs. 1 and 2, the only difference being that it is the core itself that forms the inner edge of the receptacle instead of an inner membrane serving this purpose.

In most inductors to which the present invention is applied the difference of potential between the upper and lower turns of the coil is so small that the use of a metal membrane does not involve any undue insulation problems and the purpose of an insulating layer, such as that shown at 9 of Fig. 2 or 24 of Fig. 4 is to guard against the possibility of the insulation of the coil being scraped, to result in a short circuit through the metal foil.

Where insulation is a problem "Teflon" or a similar synthetic membrane may be used. In larger sizes of equipment the cost of large areas of "Teflon" may cause an undue increase in cost and sacrifice some of the economic advantages of the present invention. The places where insulation is important are ordinarily at the ends of the coils and under these circumstances the coil may be encased as shown in Fig. 5. Here the central portion 37 of the membrane is made of foil while the actual receptacles that receive the plastic 39 are formed by collars 41 of plastic film, cemented to the foil with a slight overlap, as indicated at 43, to seal the junction.

There are certain points in connection with the construction which are perhaps obvious but are mentioned for the sake of completeness. "Teflon" has proved to be the most satisfactory of the synthetic films. The ordinary grade of this material is resistant to wetting and hence to sealing by almost all the ordinary adhesives. This material is, however, manufactured in certain grades and with surface treatments that will cause most of the resins to adhere to it, including, in this category, the epoxy resins that are in general the most convenient for this use. It is obvious that the wettable grades should be used.

Similarly, it is obvious that the material chosen for the membrane should not melt or disintegrate at the highest temperature at which the coil will normally be called upon to operate; it is the limited temperature rise to which the ordinary grades of polyethylene will withstand as well as its greater absorption that makes this material less desirable than "Teflon."

In the case of apparatus which is to be used at temperatures far above those normally encountered none of the plastic films at present available is satisfactory. A coil intended to operate at an ambient temperature of 300° clearly cannot be protected by a membrane of tinfoil melting at approximately 232° C.; foils of any of the ductil metals such as aluminum, copper, silver, stainless steel or even gold may be required to meet the need of high-melting point and, in certain instances, resistance to corrosive atmospheres. For such special services as this, the epoxy resins are also unsuitable and the same is true of the most of the more common synthetics. The silicone rubbers, however, will withstand temperatures within this range.

It will be seen that the invention as here set forth can be modified in many of its minor phases to meet specific conditions. The examples described in detail are not, therefore, intended to limit the scope of the invention, all intended limitations being specifically set forth in the claims that follow.

I claim:

1. An electrical winding comprising a substantially cylindrical coil of insulated wire, a membrane of inherently moisture-proof, flexible material tightly surrounding said coil and forming a taut, tubular covering in close-fitting conformity with the outer convolutions of said coil, said membrane extending axially beyond the ends of said coil and forming a receptacle at each end thereof, and a body of moisture-resistant resin permeating said coil and filling said receptacles, said membrane and resin adhering together and forming a moisture-proof sheath wholly enveloping said coil, the membrane itself having substantially zero moisture-transmission properties independent of the resin, the resin-filled receptacles closing the ends of the tubular membrane, while the close-fitting membrane efficiently transmits heat out of the coil, the resin permeating the coil filling any voids therein, whereby the small size and weight of open-coil windings and the reliability of encased windings are both achieved.

2. A winding as in claim 1, wherein said membrane is a sheet of metal foil having a width exceeding the height of the coil.

3. A winding as in claim 1, wherein said membrane is a sheet of polytetrafluoroethylene.

4. A winding as in claim 1, wherein said membrane comprises a sheet of metal foil surrounding the central portion of said coil, a collar of synthetic plastic film sealed to said foil and projecting beyond one end of said coil, and another collar of synthetic plastic film sealed to said foil and projecting beyond the other end of said coil, said collars forming the resin-filled receptacles of the two ends of the coil.

5. An electrical winding comprising a substantially cylindrical, multi-layered coil of insulated wire, a flexible membrane tightly surrounding said coil and forming a taut, tubular covering in close-fitting conformity with the outer convolutions of said coil, said membrane consisting of an inner layer of paper and an outer layer of an inherently moisture-proof material, said membrane extending axially beyond the ends of said coil and forming a receptacle at each end thereof, and a body of moisture-resistant resin permeating said coil and paper and filling said receptacles, said membrane and resin adhering together and forming a moisture-proof sheath wholly enveloping said coil, said outer layer itself having substantially zero moisture-transmission properties independent of the resin, the resin-filled receptacles closing the ends of the tubular membrane, while the close-fitting membrane efficiently transmits heat out of the coil, the resin permeating the coil and the paper filling any voids therein.

References Cited in the file of this patent

UNITED STATES PATENTS

| | | |
|---|---|---|
| 1,315,365 | Hamm | Sept. 9, 1919 |
| 1,427,324 | Priestly | Aug. 29, 1922 |
| 2,183,550 | Deutschmann | Dec. 19, 1939 |
| 2,549,770 | Burnham | Apr. 24, 1951 |
| 2,873,304 | Davidson | Feb. 10, 1959 |

FOREIGN PATENTS

| | | |
|---|---|---|
| 463,676 | Great Britain | Apr. 5, 1937 |
| 485,526 | Canada | Aug. 5, 1952 |

OTHER REFERENCES

Dupont "Teflon" Tape, Jan. 15, 1951.